(12) United States Patent
Naito et al.

(10) Patent No.: US 11,046,872 B2
(45) Date of Patent: Jun. 29, 2021

(54) TWO-COMPONENT HOT MELT ADHESIVE, SOLIDIFIED PRODUCT, AND METHOD FOR CONTROLLING CROSS-LINKING TIME

(71) Applicant: TOYOTA BOSHOKU KABUSHIKI KAISHA, Aichi (JP)

(72) Inventors: Tatsuo Naito, Aichi (JP); Masakazu Kito, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 11 days.

(21) Appl. No.: 16/699,165

(22) Filed: Nov. 29, 2019

(65) Prior Publication Data
US 2020/0172772 A1 Jun. 4, 2020

(30) Foreign Application Priority Data
Dec. 3, 2018 (JP) .............................. JP2018-226563

(51) Int. Cl.
*C09J 123/26* (2006.01)
*C09J 5/00* (2006.01)

(52) U.S. Cl.
CPC .............. *C09J 123/26* (2013.01); *C09J 5/00* (2013.01); *C09J 2423/00* (2013.01)

(58) Field of Classification Search
CPC ...... C09J 2301/304; C09J 123/26; C09J 5/00; C09J 5/06
See application file for complete search history.

(56) References Cited

U.S. PATENT DOCUMENTS

| | | | | |
|---|---|---|---|---|
| 5,331,049 A | * | 7/1994 | Audett | C09J 143/04 156/321 |
| 8,091,953 B2 | | 1/2012 | Fukui et al. | |
| 2009/0082532 A1 | * | 3/2009 | Fujimura | C08F 255/02 526/127 |
| 2009/0124751 A1 | * | 5/2009 | Lucas | C09D 175/04 524/507 |
| 2011/0003094 A1 | * | 1/2011 | Becker | C08F 210/16 428/17 |
| 2011/0187158 A1 | | 8/2011 | Fukui et al. | |
| 2012/0141787 A1 | * | 6/2012 | Lee | C08F 10/10 428/355 EN |
| 2014/0287173 A1 | * | 9/2014 | Butterbach | C09J 123/0853 428/34.9 |

FOREIGN PATENT DOCUMENTS

JP    2010-023694    2/2010

OTHER PUBLICATIONS

German Office Action in corresponding German Application No. 102019132472.6, dated Dec. 2, 2020, along with English translation.

* cited by examiner

*Primary Examiner* — Robert C Boyle
(74) *Attorney, Agent, or Firm* — Greenblum & Bernstein, P.L.C.

(57) ABSTRACT

Disclosed herein are a two-component hot melt adhesive capable of appropriately adjusting its aging time while having excellent workability and pot life and a solidified product thereof and a method for controlling the cross-linking time of a two-component hot melt adhesive. The two-component hot melt adhesive separately includes: (A) a base component containing a modified polyolefin having an alkoxysilyl group; and (B) a catalyst that promotes formation of siloxane-cross linkings derived from the alkoxysilyl groups, in which when a solubility parameter of the base component (A) is defined as $SP_A$, a solubility parameter of the catalyst (B) is defined as $SP_B$, and a molecular weight of the catalyst (B) is defined as $N_M$, the $SP_A$, the $SP_B$, and $N_M$ satisfy the following formula (1) $10 \leq (X_1 \times N_M) + (X_2 \times |SP_A - SP_B|) \leq 400$ wherein $0.15 \leq X_1 \leq 0.55$ and $40 \leq X_2 \leq 80$.

16 Claims, 4 Drawing Sheets

TWO-COMPONENT HOT MELT ADHESIVE, SOLIDIFIED PRODUCT, AND METHOD FOR CONTROLLING CROSS-LINKING TIME

CROSS REFERENCE TO RELATED APPLICATIONS

The present application claims priority under 35 U.S.C. §119 to Japanese Patent Application No. 2018-226563 filed on Dec. 3, 2018, the disclosure of which is incorporated herein by reference in its entirety.

BACKGROUND OF THE INVENTION

(1) Field of the Invention

The present invention relates to a two-component hot melt adhesive, a solidified product, and a method for controlling a cross-linking time. More specifically, the present invention relates to a two-component hot melt adhesive containing a modified polyolefin having an alkoxysilyl group, a solidified product, and a method for controlling a cross-linking time.

(2) Description of Related Art

Various adhesives are conventionally used to bond various adherends together. Depending on the material of an adherend and the intended use of a bonded body, an adhesive is selected from hot melt adhesives (see, for example, JP 2010-23694 A), aqueous adhesives, solvent-based adhesives, and the like, and depending on a desired adhesive strength, a synthetic resin or the like is selected as a base component of the adhesive. Further, the adhesive to be used is appropriately selected also depending on a method for applying it onto an adherend, a temperature and pressure at which adherends are bonded together, pot life, and an open time.

SUMMARY OF THE INVENTION

Among the above various adhesives, many aqueous adhesives and solvent-based adhesives can be said to be poor in transport efficiency because their solid content is often about 50% by mass at most, and they need to contain solvents that do not function as adhesives when transported. On the other hand, hot melt adhesives have high transport efficiency because their solid content is almost 100%, and therefore solvents do not need to be transported. Further, from an environmental viewpoint, solvent-based adhesives have a problem that organic solvents evaporate in a drying step or the like performed after application onto adherends. On the other hand, hot melt adhesives do not have such a problem because they do not contain organic solvents. As described above, it can be said that hot melt adhesives are preferred in that they have high transport efficiency and no problem caused by organic solvents.

However, hot melt adhesives also have weak points. A hot melt adhesive usually contains, as a base component, a component made of a thermoplastic resin or the like, and the base component is melted, interposed between adherends, and then cooled and solidified to bond the adherends together. Therefore, in order to achieve, for example, high-performance bonding, a polymerized thermoplastic resin having a high melting point needs to be used. However, such a thermoplastic resin is poor in workability as an adhesive because of its high melting temperature and high viscosity. Further, high-melting-point hot melt adhesives tend to have a short open time between application and bonding. That is, hot melt adhesives have a trade-off problem that their workability reduces as their performance improves.

Meanwhile, hot melt adhesives called reactive hot melt adhesives are known. The base components of reactive hot melt adhesives are lower in molecular weight than those of non-reactive hot melt adhesives, but contain cross-linking groups. Therefore, such reactive hot melt adhesives have excellent workability because their base components can be handled in a low molecular weight state while their molecular weights can be increased by cross-linking via the cross-linking groups, and thus high performance bonding can be achieved. However, in order to achieve an appropriate pot life and prevent an increase in viscosity during use to improve workability, cross-linkability needs to be reduced. Therefore, a long aging time is required after bonding to complete a cross-linking reaction. As described above, reactive hot melt adhesives also have a trade-off problem that an aging time increases as workability or pot life improves. Particularly, a method capable of reducing an aging time while achieving a long pot life or a method capable of changing a balance between them is not actually known, and therefore an aging time has to be increased to improve workability and pot life.

In view of the above circumstances, it is an object of the present invention to provide a two-component hot melt adhesive capable of appropriately adjusting an aging time while maintaining excellent workability and pot life, a solidified product thereof, and a method for controlling a cross-linking time of a two-component hot melt adhesive.

A first aspect of the present invention is directed to a two-component hot melt adhesive that separately includes:

(A) a base component containing a modified polyolefin having an alkoxysilyl group; and (B) a catalyst that promotes formation of a siloxane-cross linking derived from the alkoxysilyl group in the modified polyolefin;

and that satisfies a relation of the following formula (1):

$$10 \leq (X_1 \times N_M) + (X_2 \times |SP_A - SP_B|) \leq 400 \quad (1)$$

in which $0.15 \leq X_1 \leq 0.55$ and $40 \leq X_2 \leq 80$, in which $SP_A$ is a solubility parameter of the base component (A), $SP_B$ is a solubility parameter of the catalyst (B), and $N_M$ is a molecular weight of the catalyst (B).

In the two-component hot melt adhesive according to the first aspect of the present invention, the $N_M$ can satisfies a relation of $50 \leq N_M \leq 800$.

In the two-component hot melt adhesive according to the first aspect of the present invention, the $SP_A$ and the $SP_B$ can satisfy a relation of $|SP_A - SP_B| \leq 5$.

In the two-component hot melt adhesive according to the first aspect of the present invention, the catalyst (B) can contain an amine-based compound.

In the two-component hot melt adhesive according to the first aspect of the present invention, when a number of hetero atoms contained in the amine-based compound is defined as $N_H$, the $N_M$ and the $N_H$ can satisfy a relation of $1 \leq (N_H/N_M) \times 1000 \leq 50$.

In the two-component hot melt adhesive according to the first aspect of the present invention, the amine-based compound can have a molecular weight of 500 or less.

In the two-component hot melt adhesive according to the first aspect of the present invention, the amine-based compound can have a secondary amine group or a tertiary amine group.

A second aspect of the present invention is directed to a two-component hot melt adhesive that separately includes:

(A) a base component containing a modified polyolefin having an alkoxysilyl group; and (B) a catalyst that promotes formation of siloxane-cross linkings derived from the alkoxysilyl groups in the modified polyolefin; the catalyst (B) containing an amine-based compound, and that satisfies a relation of $|SP_A-SP_B|\leq 5$, in which $SP_A$ is a solubility parameter of the base component (A), and $SP_B$ is a solubility parameter of the catalyst (B).

In the two-component hot melt adhesive according to the second aspect of the present invention, the amine-based compound has a molecular weight of 500 or less.

In the two-component hot melt adhesive according to the second aspect of the present invention, the amine-based compound can have a secondary amine group or a tertiary amine group.

The present invention is also directed to a solidified product including the two-component hot melt adhesive according to the first or second aspect of the present invention, in which a cross-linked modified polyolefin obtained by the siloxane-cross linking, and the catalyst (B) impregnated into the cross-linked modified polyolefin are contained.

The present invention is also directed to a method for controlling a cross-linking time of a two-component hot melt adhesive separately having a base component (A) and a catalyst (B), includes:

selecting a combination of the base component (A) and the catalyst (B) such that a value $X_3$ calculated by a following formula (2) becomes larger to increase the cross-linking time, or selecting a combination of the base component (A) and the catalyst (B) such that a value $X_3$ calculated by the following formula (2) becomes smaller to reduce the cross-linking time, $$(X_1 \times N_M)+(X_2\times |SP_A-SP_B|)=X_3 \qquad (2)$$

in which $0.15\leq X_1 \leq 0.55$, $40\leq X_2 \leq 80$, and $10\leq X_3 \leq 400$, in which $SP_A$ is a solubility parameter of the base component (A), $SP_B$ is a solubility parameter of the catalyst (B), and $N_M$ is a molecular weight of the catalyst (B), in which the base component (A) contains a modified polyolefin having an alkoxysilyl group, and the catalyst (B) promotes formation of a siloxane-cross linking derived from the alkoxysilyl group in the modified polyolefin.

In the method for controlling a cross-linking time of a two-component hot melt adhesive according to the present invention, the $N_M$ can satisfy a relation of $50\leq N_M \leq 800$.

In the method for controlling a cross-linking time of a two-component hot melt adhesive according to the present invention, the $SP_A$ and the $SP_B$ can satisfy a relation of $|SP_A-SP_B|\leq 5$.

In the method for controlling a cross-linking time of a two-component hot melt adhesive according to the present invention, the catalyst (B) can contain an amine-based compound.

In the method for a controlling cross-linking time of a two-component hot melt adhesive according to the present invention, when a number of hetero atoms contained in the amine-based compound is defined as $N_H$, the $N_M$ and the $N_H$ can satisfy a relation of $1\leq (N_H/N_M)\times 1000\leq 50$.

The two-component hot melt adhesive according to the present invention contains the component (A) and the component (B) satisfying the formula (1), and therefore an aging time can appropriately be adjusted while excellent workability and pot life are maintained.

The solidified product according to the present invention can achieve excellent bonding strength. Particularly, excellent heat resistance can be achieved.

The method for controlling a cross-linking time of a two-component hot melt adhesive according to the present invention can appropriately adjust an aging time while maintaining excellent workability and pot life.

DETAILED DESCRIPTION OF PREFERRED EMBODIMENTS

Hereinbelow, the present invention will be described in detail. The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description taken with the drawings makes apparent to those skilled in the art how the several forms of the present invention may be embodied in practice.

1. Two-Component Hot Melt Adhesive (First Aspect of Invention)

The two-component hot melt adhesive according to the First Aspect of Invention is characterized in that the adhesive separately includes:

(A) a base component containing a modified polyolefin having an alkoxysilyl group; and (B) a catalyst that promotes formation of a siloxane-cross linking derived from the alkoxysilyl group in the modified polyolefin;

and that the adhesive satisfies a relation of the following formula (1):

$$10\leq (X_1\times N_M)+(X_2\times|SP_A-SP_B|)\leq 400 \qquad (1)$$

wherein $0.15\leq X_1\leq 0.55$ and $40\leq X_2 \leq 80$, wherein $SP_A$ is a solubility parameter of the base component (A), $SP_B$ is a solubility parameter of the catalyst (B), and $N_M$ is a molecular weight of the catalyst (B).

The "base component (A)" contains a modified polyolefin having an alkoxysilyl group. The modified polyolefin is a component capable of forming siloxane-cross linkings derived from the alkoxysilyl groups. The modified polyolefin is interposed between adherends to be bonded, and then forms an adhesive layer due to siloxane-cross linking. In the adhesive layer, molecules of the modified polyolefin are three-dimensionally linked together. Therefore, the adhesive layer can bond the adherends together more strongly, and can have high strength and high heat resistance.

The alkoxysilyl group contained in the modified polyolefin resin may have only one alkoxy group, but preferably has two or more alkoxy groups. When the alkoxysilyl group has two or more alkoxy groups, alkyl groups constituting the alkoxy groups may be the same or different from each other. Examples of the alkoxy group include a methoxy group, an ethoxy group, a propyloxy group, an isopropyloxy group, a butoxy group, a tert-butoxy group, a phenoxy group, and a benzyloxy group. These alkoxy groups may be used singly or in combination of two or more of them.

When the alkoxysilyl group has another group other than the alkoxy group, examples of the other group include a hydrogen atom, a halogen atom, an alkyl group, an alkoxy group, an acyloxy group, an amino group, and an aminooxy group.

Specific examples of the alkoxysilyl group include: trialkoxysilyl groups such as a trimethoxysilyl group and a triethoxysilyl group; alkyldialkoxysilyl groups such as a methyldimethoxysilyl group, a methyldiethoxysilyl group, and a methylmethoxyethoxysilyl group; and dialkylalkoxysilyl groups such as a dimethylmethoxysilyl group and a diethylmethoxysilyl group. Among them, from the viewpoint of cross-linking speed, a group having a larger number of alkoxy groups is preferred, and a group having a smaller number of carbon atoms of the alkyl group is more preferred. More specifically, a trimethoxysilyl group and a methyldimethoxysilyl group are particularly preferred.

These alkoxysilyl groups may be linked to a polyolefin skeleton that will be described later (i.e., to carbon atoms of a main chain skeleton) directly or through a hydrocarbon group. The hydrocarbon group may be, for example, an alkylene group having 1 to 3 carbon atoms.

The structure of a polyolefin skeleton (main chain skeleton) constituting the modified polyolefin is not limited, and when a total amount of structural units constituting the polyolefin skeleton is taken as 100%, 50% or more of the structural units are preferably derived from an olefin monomer. Examples of the olefin monomer include ethylene, propylene, 1-butene, 1-pentene, 3-methyl-1-pentene, 4-methyl-1-pentene, 3-methyl-1-butene, 1-hexene, and 1-octene. These olefin monomers may be used singly or in combination of two or more of them. Examples of another monomer that can constitute the modified polyolefin include various vinyl monomers and styrene-based monomers. As described above, the polyolefin skeleton may be either a homopolymer or a copolymer. When the polyolefin skeleton is a copolymer, the copolymer may be either a random copolymer or a block copolymer.

It is to be noted that the amount of the modified polyolefin contained in the base component is not limited, but for example, when the total amount of the base component is taken as 100% by mass, the amount of the modified polyolefin contained in the base component is preferably 10% by mass or more (may be 100% by mass), more preferably 30% by mass or more, particularly preferably 40% by mass or more.

The base component may contain another polyolefin in addition to the modified polyolefin. Examples of the other polyolefin include non-modified polyolefins such as homopolyethylene, homopolypropylene, an ethylene copolymer, and a propylene copolymer and modified polyolefins having no alkoxysilyl group (polyolefins modified with a group other than an alkoxysilyl group). These other polyolefins may be used singly or in combination of two or more of them. Examples of the ethylene copolymer include ethylene-α-olefin copolymers such as an ethylene-propylene copolymer, an ethylene-octene copolymer, and an ethylene-butene copolymer. Examples of the propylene copolymer include propylene-α-olefin copolymers such as a propylene-1-butene copolymer and a propylene-ethylene copolymer.

The solubility parameter $SP_A$ of the base component (A) varies depending on various conditions. More specifically, the solubility parameter $SP_A$ can be changed by, for example, the form of the alkoxysilyl group contained in the modified polyolefin (e.g., the number of alkoxy substituents), the amount of the alkoxysilyl group contained in the modified polyolefin (modification amount), the properties of the other polyolefin other than the modified polyolefin, or the ratio of the other polyolefin other than the modified polyolefin.

More specifically, the $SP_A$ tends to be larger when the amount of modification of the modified polyolefin with the alkoxysilyl group is larger, and the $SP_A$ tends to be smaller when the amount of modification with the alkoxysilyl group is smaller. Further, the $SP_A$ tends to be larger when the number of alkoxy substituents of the alkoxysilyl group is larger, and the $SP_A$ tends to be smaller when the number of alkoxy substituents of the alkoxysilyl group is smaller. Further, the $SP_A$ tends to be larger when the amount of the non-modified polyolefin contained in the base component (A) is smaller, and the $SP_A$ tends to be smaller when the amount of the non-modified polyolefin is larger. Further, the $SP_A$ tends to be larger when the amount of the other modified polyolefin modified with a polar group other than the alkoxysilyl group is larger, and the $SP_A$ tends to be smaller when the amount of the other modified polyolefin is smaller.

As described above, the $SP_A$ of the base component (A) varies depending on various conditions, and a value thereof is not limited, but may be, for example, $SP_A \leq 11$. This value may further be $6.0 \leq SP_A \leq 11.0$, may further be $6.5 \leq SP_A \leq 10.0$, may further be $7.0 \leq SP_A \leq 9.5$, and may further be $7.2 \leq SP_A \leq 9.0$.

It is to be noted that in this description, the unit of the SP value is "$(cal/cm^3)^{1/2}$". The solubility parameter $SP_A$ of the base component (A) is calculated by a method described in Fedors method (Polymer Engineering and Science, February, 1974, Vol. 14, No. 2, pp. 147 to 154).

The "catalyst (B)" is a component that promotes the formation of siloxane-cross linkings derived from the alkoxysilyl groups. That is, the catalyst (B) is a component that promotes cross-linking via the alkoxysilyl groups of the modified polyolefin contained in the base component (A). The kind of the catalyst (B) is not limited as long as the formation of siloxane-cross linkings derived from the alkoxysilyl groups can be promoted, and examples of the catalyst (B) include an acid, an alkali, an organic metal compound, and an amine-based compound. These catalysts may be used singly or in combination of two or more of them.

Examples of the acid include an inorganic acid and an organic acid. Examples of the inorganic acid include sulfuric acid, hydrochloric acid, and phosphoric acid. Examples of the organic acid include acetic acid, propionic acid, oxalic acid, adipic acid, sebacic acid, benzoic acid, maleic acid, maleic anhydride, and sulfonic acids [aliphatic sulfonic acids (e.g., dodecylbenzenesulfonic acid), aromatic sulfonic acids (e.g., alkylarylsulfonic acids)]. These acids may be used singly or in combination of two or more of them.

Examples of the alkali include an inorganic base and an organic base. Examples of the inorganic base include ammonia, hydroxides of alkali metals or alkaline earth metals, and carbonates of alkali metals or alkaline earth metals. Examples of the organic base include ethylamine, diethylamine, triethylamine, pyridine, pyridazine, pyrimidine, pyradine, quinoline, and triethylamine. These alkalis may be used singly or in combination of two or more of them.

Examples of the organic metal compound include carboxylates of metals such as tin, zinc, iron, lead, cobalt, and titanium. These organic metal compounds may be used singly or in combination of two or more of them.

The amine-based compound is a compound having an amine group, and is usually an organic compound. The amine group may be a primary amine group ($-NH_2$), a secondary amine group ($-NH(R)$), or a tertiary amine group ($-N(R_1)(R_2)$). These amine groups may be used singly or in combination of two or more of them. The amine-based compound may be a primary amine compound, a secondary amine compound, or a tertiary amine compound.

The kind of the amine-based compound is not limited, and examples of the amine-based compound include an acyclic amine compound, a cyclic non-conjugated amine compound, and a cyclic conjugated amine compound. The cyclic non-conjugated amine compound refers to an amine compound having a nitrogen atom that constitutes a cyclic skeleton but is not conjugated with the cyclic structure. On the other hand, the cyclic conjugated amine compound refers to an amine compound having a nitrogen atom that constitutes a cyclic skeleton and is conjugated with the cyclic structure. These amine-based compounds may be used singly or in combination of two or more of them.

Examples of the acyclic amine compound include an alkylamine, a dialkylalkylenediamine, a tetraalkylalkylenediamine, an alkanolamine, an aminoether, and guanidines. These acyclic amine compounds may be used singly or in combination of two or more of them.

Examples of the alkylamine include ethylamine, hexylamine, dodecylamine, dimethylamine, dibutylamine, trimethylamine, diethylamine, triethylamine, ethylenediamine, and polyethylenamine. Examples of the dialkylalkylenediamine include N,N'-dimethylethylenediamine, N,N-dimethylethylenediamine, N,N'-diethylethylenediamine, N,N-diethylethylenediamine, and N,N-dimethyldodecylamine. Examples of the tetraalkylalkylenediamine include tetramethylethylenediamine and tetramethylhexanediamine. Examples of the alkanolamine include methanolamine, ethanolamine, propanolamine, diethanolamine, triethanolamine, methylaminomethanol, methylaminoethanol, methylaminopropanol, N,N-(or N,N'-)dimethylaminomethanol, N,N-(or N,N'-) dimethylaminoethanol, N,N-(or N,N'-)diethylaminoethanol, N,N-(or N,N'-)dimethylaminobutanol, and N,N-(or N,N'-)dipropylaminobutanol. Examples of the aminoether include bis(2-dimethylaminoethyl)ether and bis(3-monomethylaminopropyl)ether. Examples of the guanidines include guanidine, dimethylguanidine, and tetramethylguanidine. These acyclic amine compounds may be used singly or in combination of two or more of them. Further, the amine-based compound may be a cyclic amine compound whose nitrogen atom does not constitute a cyclic skeleton, and examples thereof include cyclohexylamine and N,N-dimethylcyclohexylamine.

Examples of the cyclic non-conjugated amine compound include piperazines, triazinanes, morpholines, and piperidines. These cyclic non-conjugated amine compounds may be used singly or in combination of two or more of them.

Examples of the piperazines include piperazine and derivatives thereof. Examples of the piperazine derivatives include N-(2-aminoethyl)piperazine, 1-(dimethylaminoethyl)-4-methylpiperazine, trans-2,5-dimethylpiperazine, 1,4-bis(2-aminoethyl)piperazine, 1,4-bis(2-dimethylaminoethyl)piperazine, 1,4-bis(3-aminopropyl)piperazine, 1,4-bis(3-diaminoaminopropyl)piperazine, N,N'-dimethylpiperazine, N-methyl-N'-(2-dimethylaminoethyl)piperazine, and N-aminoethylpiperazine. Examples of the triazinanes include triazinane and derivatives thereof. Examples of the triazinane derivatives include N,N'-bis(2-aminoethyl)hexahydro-s-triazine, N,N'-bis(2-dimethylaminoethyl)hexahydro-s-triazine, N,N',N''-tris(3-aminopropyl)hexahydro-s-triazine, and N,N',N''-tris(3-dimethylaminopropyl) hexahydro-s-triazine. Examples of the morpholines include morpholine and derivatives thereof. Examples of the morpholine derivatives include N-methylmorpholine, N-ethylmorpholine, and N—(N',N'-dimethylaminoethyl)-morpholine. These cyclic non-conjugated amine compounds may be used singly or in combination of two or more of them.

Examples of the cyclic conjugated amine compound include pyridines, pyrazines, pyrimidines, triazines, quinolines, fenadines, and imidazoles. These cyclic conjugated amine compounds may be used singly or in combination of two or more of them.

Examples of the triazines include triazine and derivatives thereof. Examples of the triazine derivatives include acetoguanamine, propioguanamine, 2,4-diamino-6-methyl-1,3,5-triazine, and melamine and derivatives thereof. Examples of the melamine derivatives include dimethylmelamine, tetramethylmelamine, hexamethylmelamine, monophenylmelamine, and hexamethoxymethylmelamine. Examples of the imidazoles include 1-methylimidazole, 1,2-dimethylimidazole, 1-isobutyl-2-methylimidazole, and 1-dimethylaminopropylimidazole.

The amine-based compound may contain another hetero atom other than the nitrogen atom constituting the amine group. The SP value can be changed by adjusting a hetero atom content and a hydrocarbon group content. Examples of the hetero atom include N, O, S, P, and a halogen atom. The structure of the amine-based compound may appropriately be selected depending on requirements to be satisfied. Particularly, from the viewpoint of the SP value, an amine-based compound may be selected whose ratio of the number of hetero atoms to the molecular weight falls within a predetermined range. More specifically, an amine-based compound may be selected whose $N_M$ and $N_H$ satisfy $1 \le (N_H/N_M) \times 1000 \le 50$, when $N_M$ represents the molecular weight of the amine based compound and $N_H$ represents the number of hetero atoms constituting the amine-based compound. Further, this value may be selected so as to satisfy $2 \le (N_H/N_M) \times 1000 \le 40$, or may further be selected so as to satisfy $2 \le (N_H/N_M) \times 1000 \le 30$, or may further be selected so as to satisfy $4 \le (N_H/N_M) \times 1000 \le 25$.

Specific examples of such an amine-based compound include N,N-dimethyldodecylamine [$(N_H/N_M) \times 1000 = 4.7$, $N_H = 1$, $N_M = 213.41$, $SP_B = 8.04$], N,N,N',N'-tetramethyl-1,6-hexanediamine [$(N_H/N_M) \times 1000 = 11.6$, $N_H = 2$, $N_M = 172.32$, $SP_B = 7.99$], 2-aminoethanol [$(N_H/N_M) \times 1000 = 16.4$, $N_H = 1$, $N_M = 61.08$, $SP_B = 12.8$], N,N,N',N'-tetramethylethylenediamine [$(N_H/N_M) \times 1000 = 17.2$, $N_H = 2$, $N_M = 116.21$, $SP_B = 7.73$], N,N',N''-tris(3-dimethylaminopropyl)hexahydro-s-triazine [$(N_H/N_M) \times 1000 = 17.5$, $N_H = 6$, $N_M = 342.58$, $SP_B = 8.89$], 1-(dimethylaminoethyl)-4-methylpiperazine [$(N_H/N_M) \times 1000 = 17.5$, $N_H = 3$, $N_M = 171.29$, $SP_B = 8.89$], (2-dimethylaminoethyl)ether [$(N_H/N_M) \times 1000 = 18.7$, $N_H = 3$, $N_M = 160.26$, $SP_B = 8.08$], N-(2-aminoethyl)piperazine [$(N_H/N_M) \times 1000 = 23.2$, $N_H = 3$, $N_M = 129.21$, $SP_B = 10.9$], and ethylenediamine [$(N_H/N_M) \times 1000 = 33.3$, $N_H = 2$, $N_M = 60.1$, $SP_B=10.9$]. These amine-based compounds may be used singly or in combination of two or more of them.

When only the molecular weight of the amine-based compound is taken into consideration (i.e., when correlation with the SP value is not taken into consideration), the amine-based compound having a lower molecular weight is more likely to permeate into the base component (A), and the amine-based compound having a higher molecular weight is less likely to permeate into the base component (A). Therefore, when the amine-based compound is used as the catalyst (B), the molecular weight range thereof is not limited, but is preferably 800 or less. This is because, as described above, an excessively high molecular weight of the amine-based compound may cause a problem that the amine-based compound is less likely to permeate into the base component (A). On the other hand, the molecular weight of the amine-based compound is preferably 35 or more. As described above, the amine-based compound having a low molecular weight may exhibit excellent permeability, but tends to easily evaporate. Therefore, when the catalyst (B) that easily evaporates is used, it is preferably used in an environment in which evaporation is controlled (e.g., in a pressurized environment). The molecular weight ($N_M$) of the amine-based compound is preferably 55 or more, more preferably 80 or more, particularly preferably 100 or more. Further, the molecular weight of the amine-based compound is preferably 600 or less, more preferably 500 or less, even more preferably 350 or less, particularly preferably 270 or less, more particularly preferably 230 or less.

As the amine-based compound, an amine compound having a secondary amine group or a tertiary amine group may be selected. The kind of a substituent linked to the nitrogen atom of the secondary amine group or the tertiary amine group is not limited, but the substituent is preferably a methyl group or an ethyl group, particularly preferably a methyl group. This amine-based compound preferably has two or more secondary amine groups or tertiary amine groups.

Specific examples of such an amine-based compound include N,N-dimethyldodecylamine, N,N,N',N'-tetramethyl-1,6-hexanediamine, N,N,N',N'-tetramethylethylenediamine, N,N',N''-tris(3-dimethylaminopropyl)hexahydro-s-triazine, 1-(dimethylaminoethyl)-4-methylpiperazine, and (2-dimethylaminoethyl)ether. These amine-based compounds may be used singly or in combination of two or more of them.

The solubility parameter $SP_B$ of the catalyst (B) varies depending on the structure of the catalyst (B), and a desired $SP_B$ can be obtained by selecting the structure of the catalyst. That is, the $SP_B$ can be adjusted. The $SP_B$ is not limited as long as it takes an appropriate value, and may satisfy, for example, $SP_B \leq 14$. Further, this value may satisfy $6.0 \leq SP_B \leq 14.0$, may further satisfy $6.5 \leq SP_B \leq 13.0$, may further satisfy $7.0 \leq SP_B \leq 12.5$, and may further satisfy $7.2 \leq SP_B \leq 11.0$.

It is to be noted that in this description, the unit of the SP value is "$(cal/cm^3)^{1/2}$". The solubility parameter $SP_B$ of the catalyst (B) is calculated by a method described in the Fedors method (Polymer Engineering and Science, February, 1974, Vol. 14, No. 2, pp. 147 to 154).

As described above, the two-component hot melt adhesive according to the first aspect of the present invention includes separately the base component (A) and the catalyst (B). The phrase "includes separately" means that the base component (A) and the catalyst (B) are present separately without being in contact with each other. The separation may be achieved in any way. For example, the base component (A) and the catalyst (B) may be contained in separate and different containers, respectively.

When the two-component hot melt adhesive according to the first aspect of the present invention is used, the permeation depth of the catalyst (B) into the base component (A) can be controlled by selecting a value calculated by the formula (1) within its selectable range. The control of the permeation depth, as a result, makes it possible to control the cross-link formation time of the modified polyolefin.

More specifically, when the $N_M$, the $SP_A$, and the $SP_B$ of the two-component hot melt adhesive are selected so that a value calculated by the formula (1) "$(X_1 \times N_M)+(X_2 \times |SP_A-SP_B|)$" is smaller, the catalyst (B) can permeate into the base component (A) more widely and deeply after contact between the base component (A) and the catalyst (B). A combination of the base component (A) and the catalyst (B) such that the catalyst (B) can permeate into the base component (A) more widely and deeply can achieve a high permeation speed, and therefore the catalyst (B) can permeate into the base component (A) in a shorter time, which as a result makes it possible to reduce the cross-link formation time of the modified polyolefin. That is, the aging time of the two-component hot melt adhesive can be controlled to be shorter.

A conventional hot melt adhesive containing a modified polyolefin is supplied as a one-component adhesive containing, for example, an organic tin catalyst. However, such a one-component adhesive is adjusted to have a sufficient pot life from the viewpoint of workability, and therefore requires a long aging time (i.e., requires a long time to achieve sufficient cross-linking). When such a hot melt adhesive containing a modified polyolefin is used, there is a problem that its long aging time is, as a result, a rate-limiting factor in a production process. Further, when such a hot melt adhesive containing a modified polyolefin is used, a problem of VOC (volatile organic compound) emission may arise. More specifically, in order to cross-link a modified polyolefin having an alkoxysilyl group, an alkoxy group needs to be discharged to the outside of a system as an alkanol by hydrolysis, and therefore the alkanol is successively generated for a long time during cross-link formation. That is, there is a problem that VOC may always be formed during aging.

Therefore, such an adhesive as described above is difficult to use for products that need to be produced in a short time and to complete aging in a short time. On the other hand, the two-component hot melt adhesive according to the first aspect of the present invention can be provided as a combination of the base component (A) and the catalyst (B) such that excellent permeation of the catalyst (B) is achieved. In this case, aging can be completed in a short time, and therefore production can be performed in a short time, and the time of VOC emission can be reduced.

The value calculated by the formula (1) can appropriately be selected depending on the purpose. For example, for the purpose of obtaining a two-component hot melt adhesive controlled to have a shorter aging time, the value of the formula (1) may be within the range of, for example, $10 \leq (X_1 \times N_M)+(X_2 \times |SP_A-SP_B|) \leq 250$. Further, this value may further be within the range of $12 \leq (X_1 \times N_M)+(X_2 \times |SP_A-SP_B|) \leq 200$, may further be within the range of $14 \leq (X_1 \times N_M)+(X_2 \times |SP_A-SP_B|) \leq 180$, and may further be within the range of $16 \leq (X_1 \times N_M)+(X_2 \times |SP_A-SP_B|) \leq 150$.

It is to be noted that in this case, $X_1$ and $X_2$ are within the range of $0.15 \leq X_1 \leq 0.55$ and the range of $40 \leq X_2$ 80, respectively, and may be within the range of $0.20 \leq X_1 \leq 0.54$ and the range of $45 \leq X_2 \leq 65$, may further be within the range of 0.25≤$X_1$≤0.53 and the range of 47≤$X_2$≤59, and are particularly preferably within the range of 0.27≤$X_1$≤0.52 and the range of 50≤$X_2$≤57, respectively.

Further, the range of the $N_M$ is not limited, either. A smaller value of the $N_M$ tends to allow the catalyst (B) to more easily permeate into the base component (A). Therefore, for the purpose of obtaining a two-component hot melt adhesive controlled to have a shorter aging time, a combination such that the catalyst (B) can more easily permeate into the base component (A) is selected, and the $N_M$ may be within the range of 55≤$N_M$≤500, 60≤$N_M$≤350, 80≤$N_M$≤270, or 100≤$N_M$≤230.

Further, the range of absolute value of the difference between the $SP_A$ and the $SP_B$, |$SP_A$–$SP_B$| is not limited, either. A smaller value of |$SP_A$–$SP_B$|) tends to allow the catalyst (B) to more easily permeate into the base component (A). Therefore, for the purpose of obtaining a two-component hot melt adhesive controlled to have a shorter aging time, the value of |$SP_A$–$SP_B$| may be within the range of 0≤|$SP_A$–$SP_B$|≤5, 0.001≤|$SP_A$–$SP_B$|≤3, 0.005≤|$SP_A$–$SP_B$| 2, or 0.008≤|$SP_A$–$SP_B$|≤1.5.

On the other hand, when the $N_M$, the $SP_A$, and the $SP_B$ of the two-component hot melt adhesive are selected so that a value calculated by the formula (1) "($X_1$× $N_M$)+($X_2$×|$SP_A$–$SP_B$|)" is larger, the permeation speed of the catalyst (B) into the base component (A) can be made lower after contact between the base component (A) and the catalyst (B). When the base component (A) and the catalyst (B) are combined to achieve a lower permeation speed, the time of cross-link formation of the modified polyolefin can be made longer. That is, the two-component hot melt adhesive has a longer aging time.

In general, the viscosity of an adhesive increases after the start of cross-link formation, which makes it difficult to handle the adhesive. Therefore, when an open time (time during which various operations can be performed after contact between the base component (A) and the catalyst (B), particularly a time during which adherends can normally be bonded together) needs to be long, a combination of the base component (A) and the catalyst (B) can be selected so that a value calculated by the formula (1) is large.

The value calculated by the formula (1) can appropriately be selected depending on the purpose. For example, for the purpose of obtaining a two-component hot melt adhesive controlled to have a longer cross-link formation time, the value of the formula (1) may be within the range of, for example, 100≤($X_1$× $N_M$)+($X_2$×|$SP_A$–$SP_B$|)≤350. This value may further be within the range of 125≤($X_1$× $N_M$)+($X_2$× |$SP_A$–$SP_B$|)≤310, or, may further be within the range of 150≤($X_1$× $N_M$)+($X_2$×|$SP_A$–$SP_B$|)≤280, or may further be within the range of 170≤($X_1$× $N_M$)+($X_2$×|$SP_A$–$SP_B$|)≤250.

It is to be noted that in this case, $X_1$ and $X_2$ are within the range of 0.15≤$X_1$≤0.55 and the range of 40≤$X_2$≤80, respectively, and may be within the range of 0.20≤$X_1$≤0.54 and the range of 45≤$X_2$≤65, may further be within the range of 0.25≤$X_1$≤0.53 and the range of 47≤$X_2$≤59, and are particularly preferably within the range of 0.27≤$X_1$≤0.52 and the range of 50≤$X_2$≤57, respectively.

Further, the range of the $N_M$ is not limited, either. A larger value of the $N_M$ tends to make it difficult for the catalyst (B) to permeate into the base component (A). Therefore, for the purpose of obtaining a two-component hot melt adhesive controlled to have a longer cross-link formation time, a combination such that the catalyst (B) is less likely to permeate into the base component (A) is selected, and the $N_M$ may be within the range of 100≤$N_M$≤800, 100≤$N_M$≤650, 100≤$N_M$≤500, 150≤$N_M$≤470, 200≤$N_M$≤430, or 250≤$N_M$≤390.

Further, the range of the |$SP_A$–$SP_B$| is not limited, either. A larger value of the |$SP_A$–$SP_B$| tends to make it more difficult for the catalyst (B) to permeate into the base component (A). Therefore, for the purpose of, for example, obtaining a two-component hot melt adhesive controlled to have a longer cross-link formation time, the |$SP_A$–$SP_B$| may be within the range of 0.5|$SP_A$–$SP_B$|≤5, 1.0≤|$SP_A$–$SP_B$|≤4.5, 1.3≤|$SP_A$–$SP_B$|≤3.8, or 1.6≤|$SP_A$–$SP_B$|≤3.5.

2. Two-Component Hot Melt Adhesive (Second Aspect of Invention)

The two-component hot melt adhesive according to the Second Aspect of Invention is characterized in that the adhesive separately includes:

(A) a base component containing a modified polyolefin having an alkoxysilyl group; and (B) a catalyst that promotes formation of a siloxane-cross linking derived from the alkoxysilyl group; the catalyst (B) containing an amine-based compound, and that the adhesive satisfies a relation of |$SP_A$–$SP_B$|≤5, wherein $SP_A$ is a solubility parameter of the base component (A), and $SP_B$ is a solubility parameter of the catalyst (B).

When the molecular weight of the amine-based compound contained in the two-component hot melt adhesive according to the second aspect of the present invention is defined as $N_M$, the $N_M$ is preferably $N_M$≤800, and may be 35 $N_M$≤650, 35≤$N_M$≤500, 55≤$N_M$≤320, 80≤$N_M$≤270, or 100≤$N_M$≤230. Further, as in the case of the two-component hot melt adhesive according to the first aspect of the present invention, the formula (1) is preferably satisfied.

The second aspect of the present invention is different from the above-described first aspect of the present invention in that the catalyst (B) is limited to one containing an amine-based compound. This amine-based compound is the same as that described above with reference to the first aspect of the present invention. Further, other components and other particulars are the same as those described above with reference to the first aspect of the present invention.

3. Method for Using Hot Melt Adhesive

A method for using the hot melt adhesive according to the first or second aspect of the present invention is not limited. In either case, the base component (A) and the catalyst (B) separately prepared are brought into contact with each other so that formation of siloxane-cross linkings derived from the alkoxysilyl groups of the base component (A) can be promoted.

The viscosity of the base component (A) can be reduced by heating, and therefore a layer formed of the base component (A) (base component layer) can be formed on an adherend or the like by heating the base component (A) to an appropriate temperature. On the other hand, when the catalyst (B) is in liquid form at ordinary temperature (25° C.), the catalyst (B) can be brought into contact with the base component layer by, for example, applying the catalyst (B) onto the base component layer. When the catalyst (B) is in solid form at ordinary temperature (25° C.), the catalyst (B) can be brought into contact with the base component layer by, for example, applying the catalyst (B) onto the base component layer after the catalyst (B) is melted by heating or dissolved or dispersed in a solvent.

The base component (A) may directly be applied onto an adherend to be bonded to form a base component layer.

However, the base component (A) may be handled as a film (film made only of the base component (A)) separately formed.

The amount of the catalyst (B) used against the base component (A) can appropriately be selected. When the base component layer is formed or the film made of the base component is formed, the thicknesses of them are not limited, and may be, for example, 1 μm or more and 1000 μm or less, 10 μm or more and 600 μm or less, or 20 μm or more and 400 μm or less. The thicknesses may appropriately be set in consideration of, for example, ease of permeation of the catalyst (B), heating temperature of the base component (A), and desired adhesive strength.

The kind of adherend to which the hot melt adhesive according to the first or second aspect of the present invention can be applied is not limited, but the hot melt adhesive according to the first or second aspect of the present invention is suitable for use in bonding not adherends small in area but adherends large in area. Examples of such adherends include films (various resin films), sheets (various resin sheets), fabrics (e.g., woven fabrics, non-woven fabrics, knitted fabrics), leathers (natural leathers, synthetic leathers), paper, wood, metal plates, and resin plates.

4. Solidified Product

A solidified product according to the present invention includes the above-described two-component hot melt adhesive, wherein a cross-linked modified polyethylene obtained by the siloxane-cross linking, and the catalyst (B) impregnated into the cross-linked modified polyolefin are contained.

The catalyst (B) contained in the solidified product usually keeps the original form of its compound. The catalyst (B) is as described above.

5. Method for Controlling Cross-Linking Time of Two-Component Hot Melt Adhesive

The method for controlling a cross-linking time of a two-component hot melt adhesive separately containing a base component (A) and a catalyst (B) of the present invention is characterized in that the method includes:

selecting a combination of the base component (A) and the catalyst (B) such that a value $X_3$ calculated by a following formula (2) becomes larger to increase the cross-linking time, or selecting a combination of the base component (A) and the catalyst (B) such that a value $X_3$ calculated by the following formula (2) becomes smaller to reduce the cross-linking time, $$(X_1 \times N_M) + (X_2 \times |SP_A - SP_B|) = X_3 \quad (2)$$

wherein $0.15 \leq X_1 \leq 0.55$, $40 \leq X_2 \leq 80$, and $10 \leq X_3 \leq 400$, wherein $SP_A$ is a solubility parameter of the base component (A), $SP_B$ is a solubility parameter of the catalyst (B), and $N_M$ is a molecular weight of the catalyst (B), that the base component (A) contains a modified polyolefin having an alkoxysilyl group, and that the catalyst (B) promotes formation of a siloxane-cross linking derived from the alkoxysilyl group in the modified polyolefin.

That is, the formula (2) in the present invention is the same as the formula (1) described above with reference to the first aspect of the present invention except that a value calculated by the formula (1) is defined as "$X_3$". The components and preferred ranges are the same as those described above with reference to the first aspect of the present invention, and the description of the first aspect of the present invention can directly be applied thereto.

The $X_3$ can appropriately be selected depending on the purpose. However, for the purpose of reducing the cross-linking time, the $X_3$ may be within the range of, for example, $10 \leq X_3 \leq 250$. This value may further be within the range of $12 \leq X_3 \leq 200$, or may further be within the range of $14 \leq X_3 \leq 180$, or may further be within the range of $16 \leq X_3 \leq 150$.

For the purpose of increasing the cross-linking time, the $X_3$ may be within the range of, for example, $100 \leq X_3 \leq 350$. This value may further be within the range of $125 \leq X_3 \leq 310$, or may further be within the range of $150 \leq X_3 \leq 280$, or may further be within the range of $170 \leq X_3 \leq 250$.

It is to be noted that in this case, the ranges of $X_1$ and $X_2$, the range of the $N_M$, the range of the $SP_A$, the range of the $SP_B$, and the range of $|SP_A - SP_B|$ are as described above.

According to this control method, a situation can be created where an open time is long by, for example, using a combination such that the cross-linking time can be made longer, and then after the completion of necessary operation, the cross-linking time can be quickly reduced by adding another catalyst (B) that increases a cross-linking speed to make contact with the base component (A). In this way, the cross-linking time can be estimated during operation by appropriately selecting two or more catalysts (B).

EXAMPLES

1. Base Component (A)

As a base component (A), a base component containing a modified polyolefin having an alkoxysilyl group was selected. This base component (A) has an $SP_A$ of 8.00.

2. Catalyst (B)

As catalysts (B), catalysts ($B_{01}$) to ($B_{10}$) shown in Table 1 were selected. The $N_M$ and the $SP_B$ of each of the catalysts are shown in Table 1.

Catalyst ($B_{01}$)
 : N,N,N',N'-tetramethyl-1,6-hexanediamine
 : CAS 111-18-2
 : $SP_B$=7.99, $N_M$=172.32, $(N_H/N_M) \times 1000$=11.61

Catalyst ($B_{02}$)
 : N,N',N''-tris(3-dimethylaminopropyl)hexahydro-s-triazine
 : CAS 15875-13-5
 : $SP_B$=8.89, $N_M$=342.58, $(N_H/N_M) \times 1000$=17.51

Catalyst ($B_{03}$)
 : N,N-dimethyldodecylamine
 : CAS 112-18-5
 : $SP_B$=8.04, $N_M$=213.41, $(N_H/N_M) \times 1000$=4.69

Catalyst ($B_{04}$)
 : bis(2-dimethylaminoethyl) ether
 : CAS 3033-62-3
 : $SP_B$=8.08, $N_M$=160.26, $(N_H/N_M) \times 1000$=18.72

Catalyst ($B_{05}$)
 : 1-(dimethylaminoethyl)-4-methylpiperazine
 : CAS 104-19-8
 : $SP_B$=8.89, $N_M$=171.28, $(N_H/N_M) \times 1000$=17.51

Catalyst ($B_{06}$)
 : 2-aminoethanol
 : CAS 141-43-5
 : $SP_B$=12.8, $N_M$=61.08, $(N_H/N_M) \times 1000$=32.74

Catalyst ($B_{07}$)
 : ethylenediamine
 : CAS 107-15-3
 : $SP_B$=10.9, $N_M$=60.10, $(N_H/N_M) \times 1000$=33.28

Catalyst ($B_{08}$)

: N-(2-aminoethyl)piperazine
: CAS 140-31-8
: $SP_B$=10.9, $N_M$=129.21, $(N_H/N_M) \times 1000$=23.22
Catalyst ($B_{09}$)
: N,N,N',N'-tetramethylethylenediamine
: CAS 110-18-9
: $SP_B$=7.73, $N_M$=116.21, $(N_H/N_M) \times 1000$=17.21
Catalyst ($B_{10}$)
: dibutyltin dilaurate
: CAS 77-58-7

Catalyst ($B_{06}$): y=5.1871 ln(x)−20.787
Catalyst ($B_{07}$): y=9.2362 ln(x)−12.12
Catalyst ($B_{08}$): y=13.086 ln(x)−15.793
Catalyst ($B_{09}$): y=76.92 ln(x)−49.781
Catalyst ($B_{10}$): y=5.5261 ln(x)+32.551

Further, from each of the above logarithmic approximation curves, the permeation depth (μm) of the catalyst (B) after a lapse of 60 minutes was calculated, and the result is shown in Table 1 as "permeation depth (μm)".

TABLE 1

| Experimental Examples | Catatlyst | $SP_B$ | ΔSP | Molecular weight $N_M$ | Minimum value | Maximum value | Trend estimated value | Permeation depth (μm) |
|---|---|---|---|---|---|---|---|---|
| | | | | Values Calculated by formula (1) | | | | |
| 1 | $B_{01}$ | 7.99 | 0.01 | 172.32 | 26.25 | 95.58 | 60.91 | 190.31 |
| 2 | $B_{02}$ | 8.89 | 0.89 | 342.58 | 86.99 | 259.62 | 173.30 | 62.46 |
| 3 | $B_{03}$ | 8.04 | 0.04 | 213.41 | 33.61 | 120.58 | 77.09 | 181.73 |
| 4 | $B_{04}$ | 8.08 | 0.08 | 160.26 | 27.24 | 94.54 | 60.89 | 189.42 |
| 5 | $B_{05}$ | 8.89 | 0.89 | 171.28 | 61.29 | 165.40 | 113.35 | 211.07 |
| 6 | $B_{06}$ | 12.8 | 4.80 | 61.08 | 201.16 | 417.59 | 310.80 | 1.96 |
| 7 | $B_{07}$ | 10.9 | 2.90 | 60.10 | 125.02 | 265.06 | 195.04 | 25.7 |
| 8 | $B_{08}$ | 10.9 | 2.90 | 129.21 | 135.38 | 303.07 | 219.22 | 37.79 |
| 9 | $B_{09}$ | 7.73 | 0.27 | 116.21 | 28.23 | 85.52 | 56.87 | 364.72 |
| 10 | $B_{10}$ | 8.88 | 0.88 | 631.56 | 129.93 | 417.76 | 273.85 | 55.18 |

: $SP_B$=8.88, $N_M$=631.56

3. Measurement of Permeation Depth

The base component (A) described above in 1 was heated to 180° C. and pressed to form a base component layer processed into sheet form with a thickness of 600 μm.

Figure 1:
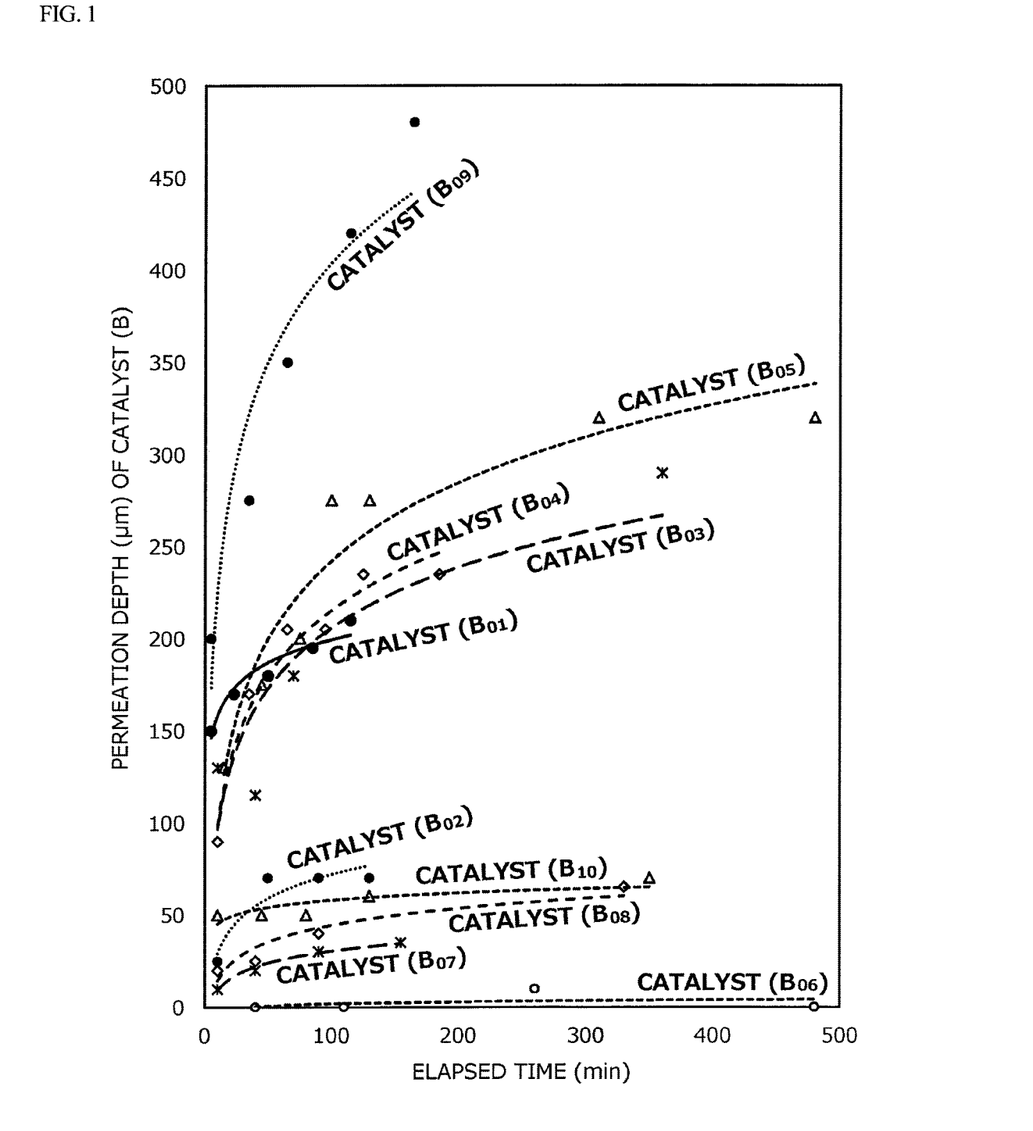
FIG. 1 is a graph showing the correlation between a trend estimated value and a measured permeation depth of a catalyst (B)

Then, any one of the catalysts (B) described above in 2 was applied onto the surface of the base component layer formed above in an amount of 35 g/m² under an environment at a temperature of 23° C. Then, the depth that the catalyst (B) permeated into the base component layer had reached was measured every predetermined time after the application of the catalyst (B) with the use of an infrared imaging system (manufactured by PerkinElmer, Model "Spotlight 400"). The results are shown in FIG. 1 as a graph indicating the correlation between the permeation depth of the catalyst (μm) and the elapsed time. Further, a logarithmic approximation curve was developed for each of the catalysts (B), and is also shown in FIG. 1. It is to be noted that the depth that the catalyst (B) has reached means the maximum depth at which a characteristic peak can be detected.

As the characteristic peak used to identify each of the catalysts (B) with the above-described infrared imaging system, a peak at the following wave number was selected.

Catalyst ($B_{01}$): 1066-1072 cm⁻¹
Catalyst ($B_{02}$): 1052-1020 cm⁻¹
Catalyst ($B_{03}$): 1052-1020 cm⁻¹
Catalyst ($B_{04}$): 1068-1032 cm⁻¹
Catalyst ($B_{05}$): 1052-990 cm⁻¹
Catalyst ($B_{06}$): 1055-1072 cm⁻¹
Catalyst ($B_{07}$): 3684-3091 cm⁻¹
Catalyst ($B_{08}$): 3684-3091 cm⁻¹
Catalyst ($B_{09}$): 1054-1019 cm⁻¹
Catalyst ($B_{10}$): 1671-1529 cm⁻¹

The logarithmic approximation curves are as follow.
Catalyst ($B_{01}$): y=17.723 ln(x)+117.75
Catalyst ($B_{02}$): y=18.63 ln(x)−13.821
Catalyst ($B_{03}$): y=47.4311 ln(x)−12.47
Catalyst ($B_{04}$): y=51.002 ln(x)−19.403
Catalyst ($B_{05}$): y=61.18 ln(x)−39.419

4. Calculation of Trend Estimated Value

On the basis of the measured values shown in FIG. 1, multiple regression analysis was performed using "predicted permeation depth" (permeation depth after a lapse of 60 minutes) as an objective variable and "$|SP_A-SP_B|$" (i.e., ΔSP) and the molecular weight $N_M$ of the catalyst (B) as explanatory variables to obtain the following multiple regression expression.

[Predicted permeation depth(μm)]=−0.295×$N_M$−61.324×ΔSP+278.635

Further, each of the variables of the obtained multiple regression expression was adjusted so that values of the permeation depth calculated on the basis of the measured values and shown in Table 1 fell within the ranges to obtain the formula (1):

$$10 \leq (X_1 \times N_M) + (X_2 \times |SP_A - SP_B|) \leq 400 \quad (1)$$

wherein $0.15 \leq X_1 \leq 0.55$ and $40 \leq X_2 \leq 80$.

Figure 2:
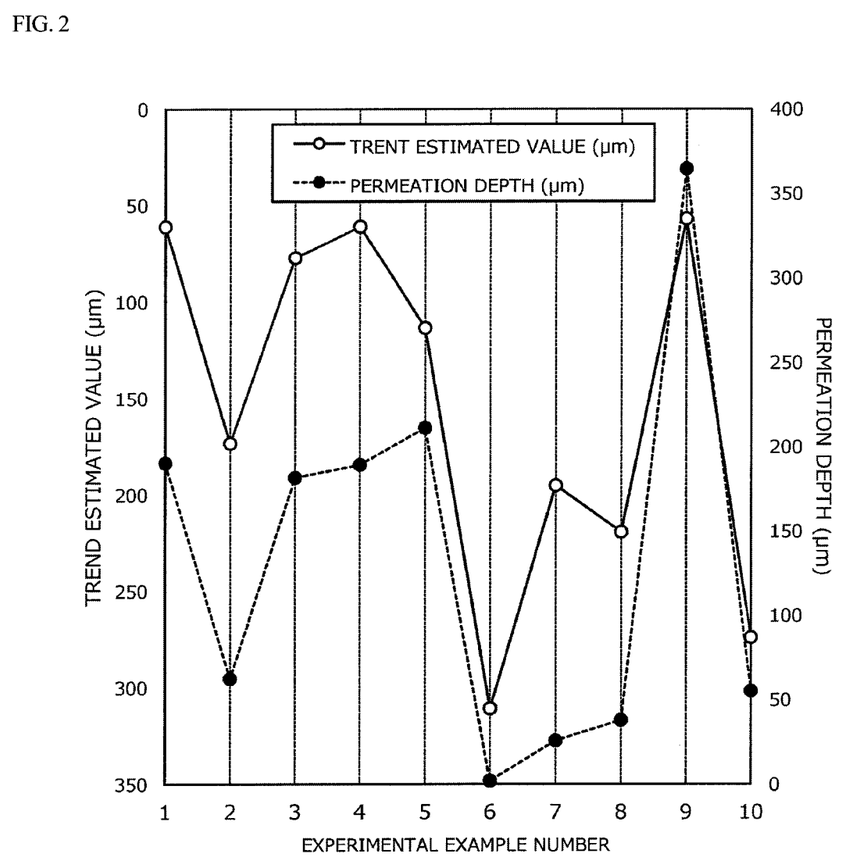
FIG. 2 is a graph showing the correlation between an elapsed time and a measured permeation depth of the catalyst (B)

A minimum value ($X_1$=0.15, $X_2$=40) and a maximum value ($X_1$=0.55, $X_2$=65) are also shown in Table 1, which were calculated by introducing the $SP_B$ of each of the catalysts (B) (SP value of the catalyst (B)) shown in Table 1, the molecular weight $N_M$ of each of the catalysts (B) shown in Table 1, and the ΔSP (value of $|SP_A-SP_B|$) of each of the combinations shown in Table 1 into the formula (1). Further, the average of the maximum value and the minimum value is also shown in Table 1 as a "trend estimated value". Further, a graph is shown in FIG. 2, which was obtained by plotting the "trend estimated value" and the "permeation depth" of each of Experimental Examples shown in Table 1. It is to be noted that a value calculated by the formula (1) and a value calculated by the formula (2) are the same.

5. Correlation Between Permeability and Cross-Linking Speed

In order to examine the correlation between permeation speed and cross-linking speed, cross-linking speeds were tracked using the catalyst ($B_{01}$) (Experimental Example 1), the catalyst ($B_{04}$) (Experimental Example 4), the catalyst (B₀₅) (Experimental Example 5), and the catalyst (B₁₀) (Experimental Example 10) out of the above-described catalysts. More specifically, each of the catalysts (B) was applied, and after a lapse of 72 hours, the concentration of the alkoxysilyl group (group linked to Si) contained in the base component layer was measured using the same infrared imaging system as described above (peak to be measured: 1128 to 1057 cm⁻¹). The alkoxysilyl group becomes undetectable as the cross-linking of the modified polyolefin progresses, and therefore the amount of the alkoxysilyl group to be detected reduces in proportion to the degree of progression of cross-linking of the modified polyolefin. The thus obtained imaging chart is shown in FIG. 3.

Figure 3:
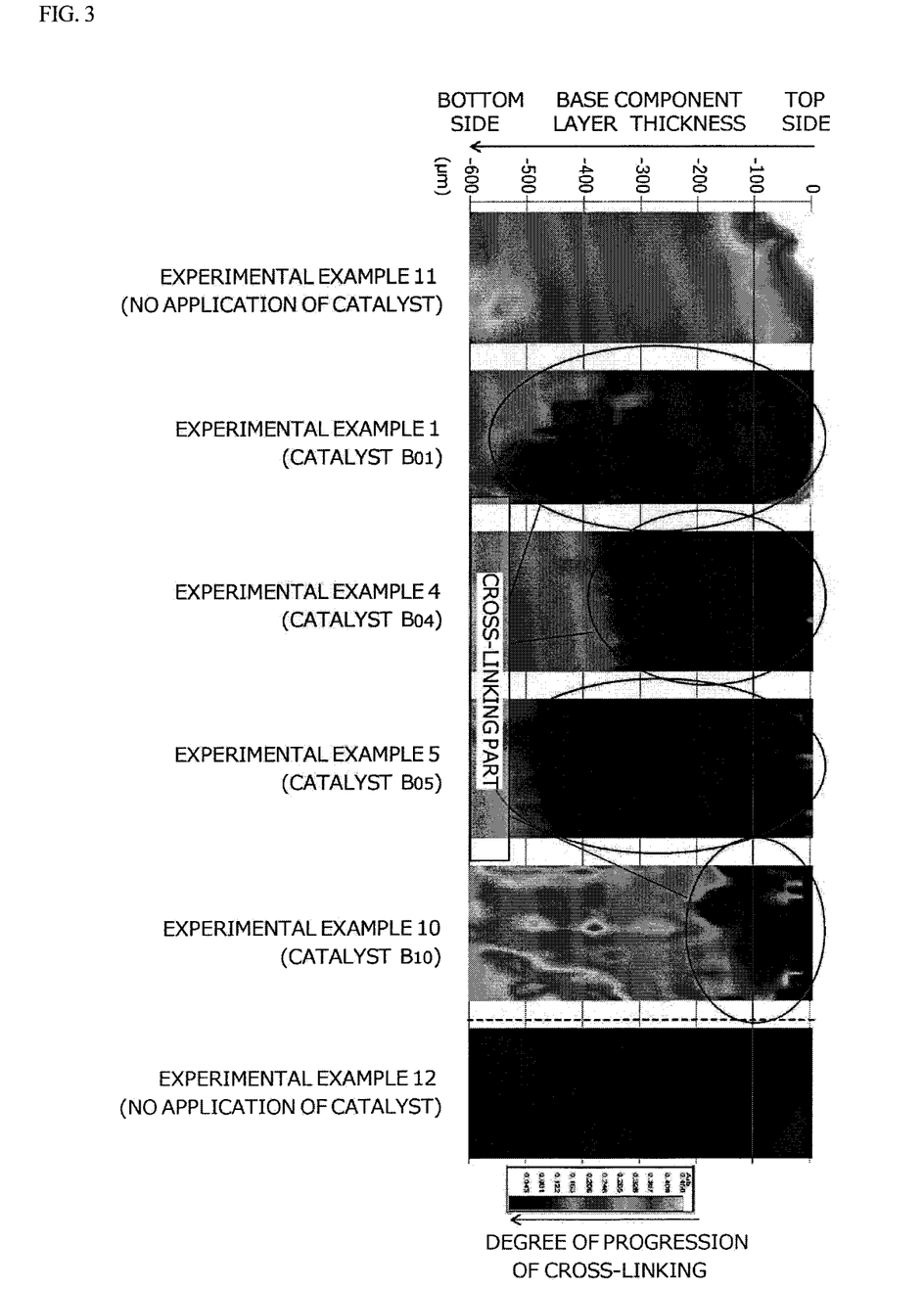
FIG. 3 is a chart obtained by measuring the degree of progression of cross-linking in each of Experimental Examples.

For reference purposes, data measured after a lapse of 72 hours without applying the catalyst (B) (Experimental Example 11) and data measured after a lapse of 1 month without applying the catalyst (B) (Experimental Example 12) are also shown in FIG. 3.

6. Effects of Examples

The "trend estimated value" shown in Table 1 and the "permeation depth" shown in Table 1 are shown as graphs in FIG. 2. As can be seen from the results, in Experimental Examples, the trend of the trend estimated value determined using the formula (1) agrees well with the trend of the permeation depth calculated on the basis of the measured values. This reveals that the permeation depth of the catalyst (B) can hourly be estimated to a high degree by using the formula (1), the molecular weight $N_M$ of the catalyst (B), and the $\Delta SP$.

Further, as can be seen from the results shown in FIG. 3, the degree of progression of cross-linking increases in response to the permeation depth. This reveals that by designing the two-component hot melt adhesive on the basis of the prediction of the permeation depth, the degree of progression of cross-linking can, as a result, be controlled.

As described above, by using the formula (1) to select a combination of the base component (A) and the catalyst (B) constituting the two-component hot melt adhesive, the time required for permeation of the two-component hot melt adhesive can be predicted. When a combination of the base component (A) and the catalyst (B) such that a value calculated by the formula (1) is smaller is selected, the catalyst (B) is more likely to permeate into the base component (A). As a result, a two-component hot melt adhesive having a short aging time can be obtained. On the other hand, when a combination of the base component (A) and the catalyst (B) such that a value calculated by the formula (1) is larger is selected, the catalyst (B) is less likely to permeate into the base component (A). As a result, a two-component hot melt adhesive can be obtained whose cross-link formation time is controlled to be longer to achieve a long open time.

Similarly, when a combination such that the value calculated by the formula (1) is smaller is selected, the cross-linking time of the two-component hot melt adhesive can be controlled to be shorter. On the other hand, when a combination such that a value calculated by the formula (1) is larger is selected, the cross-linking time of the two-component hot melt adhesive can be controlled to be longer.

Figure 4:
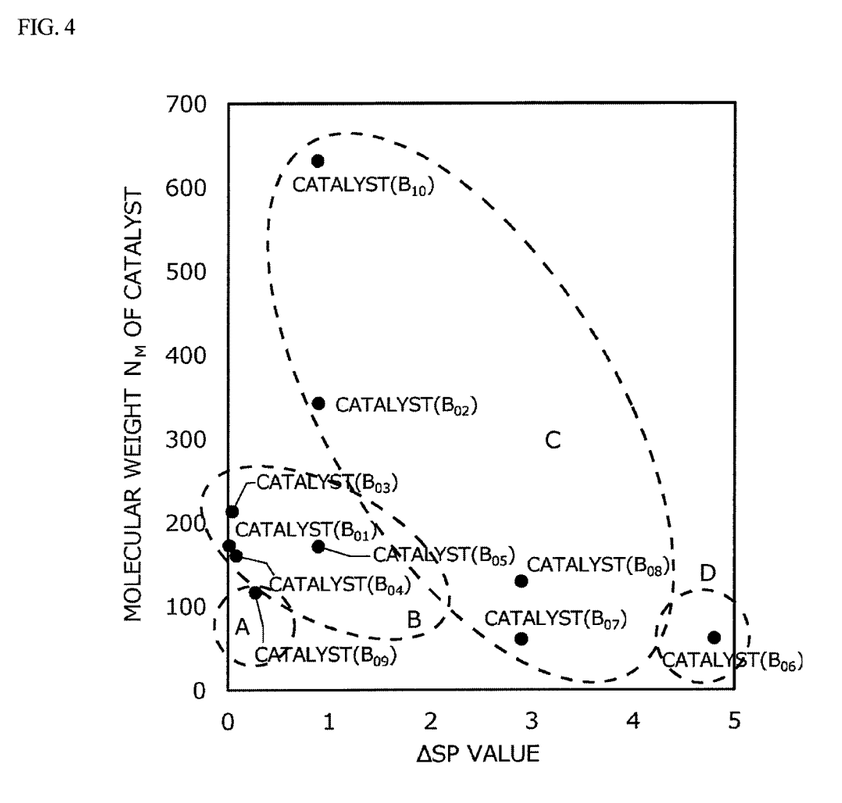
FIG. 4 is a graph obtained by plotting the ASP and the molecular weight $N_M$ of each catalyst to show correlation between them.

As can be seen from FIG. 4, the catalysts (B) can be classified into, for example, four groups (A) to (D). More specifically, A is a group that has a very high permeation speed and is therefore highly effective at promoting cross-linking, but is likely to evaporate and therefore requires selection of a working environment; B is a group that has a very high permeation speed and is therefore highly effective at promoting cross-linking and has excellent workability in a normal environment; C is a group that has a permeation speed not always high and is therefore suitable for relatively moderate cross-linking, and has excellent workability in a normal environment; and D is a group that has a low permeation speed and is therefore effective at slowly promoting cross-linking. This classification is merely an example.

It is to be noted that the foregoing examples have been provided merely for the purpose of explaining and are in no way to be construed as limiting of the present invention. While the present invention has been described with reference to exemplary embodiments, it is understood that the words used herein are words of description and illustration, rather than words of limitation. Changes may be made within the purview of the appended claims, as presently stated and as amended, without departing from the scope and spirit of the present invention in its aspects. Although the present invention has been described herein with reference to particular structures, materials, and embodiments, the present invention is not intended to be limited to the particulars disclosed herein; rather the present invention extends to all functionally equivalent structures, methods, and uses, such as are within the scope of the appended claims.

The present invention can be used in various technical fields. More specifically, the present invention can suitably be used in technical fields involving bonded bodies used in various industries such as interior and exterior materials for vehicles such as automobiles and railway vehicles and interior and exterior materials for airplanes, boats and ships, and buildings.

What is claimed is:

1. A two-component hot melt adhesive that separately comprises:
    (A) a base component containing a modified polyolefin having an alkoxysilyl group; and
    (B) a catalyst that promotes formation of a siloxane-cross linking derived from the alkoxysilyl group in the modified polyolefin;
    and that satisfies a relation of the following formula (1):

$$10 \leq (X_1 \times N_M) + (X_2 \times |SP_A - SP_B|) \leq 400 \quad (1)$$

wherein $0.15 \leq X_1 \leq 0.55$ and $40 \leq X_2 \leq 80$,
    wherein $SP_A$ is a solubility parameter of the base component (A),
    $SP_B$ is a solubility parameter of the catalyst (B), and
    $N_M$ is a molecular weight of the catalyst (B).

2. The two-component hot melt adhesive according to claim 1, wherein the $N_M$ satisfies a relation of $50 \leq N_M \leq 800$.

3. The two-component hot melt adhesive according to claim 1, wherein the $SP_A$ and the $SP_B$ satisfy a relation of $|SP_A - SP_B| \leq 5$.

4. The two-component hot melt adhesive according to claim 1, wherein the catalyst (B) contains an amine-based compound.

5. The two-component hot melt adhesive according to claim 4, wherein when a number of hetero atoms contained in the amine-based compound is defined as $N_H$, the $N_M$ and the NH satisfy a relation of $1 \leq (N_H/N_M) \times 1000 \leq 50$.

6. The two-component hot melt adhesive according to claim 4, wherein the amine-based compound has a molecular weight of 500 or less.

7. The two-component hot melt adhesive according to claim 4, wherein the amine-based compound has a secondary amine group or a tertiary amine group.

8. A solidified product comprising the two-component hot melt adhesive according to claim 1, wherein a cross-linked modified polyolefin obtained by the siloxane-cross linking and the catalyst (B) impregnated into the cross-linked modified polyolefin are contained.

9. A two-component hot melt adhesive that separately comprises:

(A) a base component containing a modified polyolefin having an alkoxysilyl group; and (B) a catalyst that promotes formation of a siloxane-cross linking derived from the alkoxysilyl group; the catalyst (B) containing an amine-based compound, and that satisfies a relation of $|SP_A-SP_B|\leq 5$, wherein $SP_A$ is a solubility parameter of the base component (A), and $SP_B$ is a solubility parameter of the catalyst (B).

10. The two-component hot melt adhesive according to claim 9, wherein the amine-based compound has a molecular weight of 500 or less.

11. The two-component hot melt adhesive according to claim 9, wherein the amine-based compound has a secondary amine group or a tertiary amine group.

12. A method for controlling a cross-linking time of a two-component hot melt adhesive separately comprising a base component (A) and a catalyst (B), comprising:

selecting a combination of the base component (A) and the catalyst (B) such that a value $X_3$ calculated by a following formula (2) becomes larger to increase the cross-linking time, or selecting a combination of the base component (A) and the catalyst (B) such that a value $X_3$ calculated by the following formula (2) becomes smaller to reduce the cross-linking time, $$(X_1 \times N_M)+(X_2 \times |SP_A-SP_B|)=X_3 \qquad (2)$$

wherein $0.15 \leq X_1 \leq 0.55$, $40 \leq X_2 \leq 80$, and $10 \leq X_3 \leq 400$, wherein $SP_A$ is a solubility parameter of the base component (A), $SP_B$ is a solubility parameter of the catalyst (B), and $N_M$ is a molecular weight of the catalyst (B), wherein the base component (A) contains a modified polyolefin having an alkoxysilyl group, and the catalyst (B) promotes formation of a siloxane-cross linking derived from the alkoxysilyl group in the modified polyolefin.

13. The method for controlling a cross-linking time according to claim 12, wherein the $N_M$ satisfies a relation of $50 \leq N_M \leq 800$.

14. The method for controlling a cross-linking time according to claim 12, wherein the $SP_A$ and the $SP_B$ satisfy a relation of $|SP_A-SP_B|\leq 5$.

15. The method for controlling a cross-linking time according to claim 12, wherein the catalyst (B) contains an amine-based compound.

16. The method for controlling a cross-linking time according to claim 15, wherein when a number of hetero atoms contained in the amine-based compound is defined as $N_H$, the $N_M$ and the $N_H$ satisfy a relation of $1 \leq (N_H/N_M) \times 1000 \leq 50$.

* * * * *